United States Patent [19]

Gensheimer

[11] Patent Number: 5,745,639
[45] Date of Patent: Apr. 28, 1998

[54] APPARATUS FOR IMPROVING THE CONTINUOUS SUPPLY OR DISPLAY TIME OF FULL-MOTION VIDEO AND OTHER DATA

[75] Inventor: Joseph Michael Gensheimer, Poughkeepsie, N.Y.

[73] Assignee: International Business Machines Corporation, Armonk, N.Y.

[21] Appl. No.: 368,681

[22] Filed: Jan. 4, 1995

[51] Int. Cl.$^6$ ............................................. H04N 5/781
[52] U.S. Cl. .......................... 386/70; 386/125; 386/82
[58] Field of Search ........................ 386/69, 70, 45, 386/125, 126, 82; 360/72.2, 69; 369/32, 124, 47, 30, 48, 44.28; H04N 5/92, 5/76, 5/781

[56] References Cited

U.S. PATENT DOCUMENTS

| | | | |
|---|---|---|---|
| 4,802,021 | 1/1989 | Makagawa et al. | 386/126 |
| 4,953,035 | 8/1990 | Yoshio | 386/69 |
| 5,038,217 | 8/1991 | Hayashi et al. | 386/70 |
| 5,081,552 | 1/1992 | Glaser et al. | |
| 5,134,499 | 7/1992 | Sata et al. | 386/126 |
| 5,163,162 | 11/1992 | Berry et al. | |
| 5,218,450 | 6/1993 | Nagai et al. | 386/70 |
| 5,241,659 | 8/1993 | Parulski et al. | 386/126 |
| 5,345,433 | 9/1994 | Ohga et al. | 369/47 |
| 5,353,276 | 10/1994 | Schroder | 369/47 |
| 5,388,093 | 2/1995 | Yoshida et al. | 369/124 |
| 5,423,046 | 6/1995 | Nunnelley et al. | 395/750 |
| 5,479,303 | 12/1995 | Suzuki et al. | 386/70 |

*Primary Examiner*—Thai Tran
*Attorney, Agent, or Firm*—Lawrence D. Cutter; JoAnn Crockatt

[57] ABSTRACT

A magnetic disk drive used for full-motion video has independently actuated read and write heads combined with a register and buffer to permit data on a disk of the disk drive to be read by the read head while simultaneously new data is being written elsewhere on a disk of the disk drive over data already read by the read head. The register and buffer ensure that new data is not written over stored data until the stored data has been read by the read head.

1 Claim, 1 Drawing Sheet

APPARATUS FOR IMPROVING THE CONTINUOUS SUPPLY OR DISPLAY TIME OF FULL-MOTION VIDEO AND OTHER DATA

BACKGROUND OF THE INVENTION

1. Field of the Invention

The current invention generally relates to an apparatus for improving the continuous supply or display time of full-motion video data and other data.

2. Description of the Prior Art

An increasingly popular application for personal and other computers is full-motion video. For example, many companies are using full-motion video for delivery at employees' computers of company news and education programs. Unlike conventional magnetic tape video systems such as VCRs and camcorders which use analog signals to produce video pictures on a display, full-motion video on computers uses digital signals like those used in software programs where the signal is made up of "1"s and "0"s.

There are two ways to bring full-motion video data to the computer. One is to supply the video data in "real time" over a wire or fiber optic connection to the computer. This is analogous to a television set receiving a video signal from an antenna or CATV system. The other method is to supply the video signal from a storage device, such as a magnetic disk drive. This is analogous to a television receiving its signal from a VCR or camcorder.

Full motion video on a computer requires a tremendous quantity of digital data delivered quickly to the video display. Unfortunately most connections to computers (such as modems or twisted pair cabling) are capacity constrained below that required to support full-motion video—that is, they cannot supply the data as fast as it is needed to display full-motion. That is why many video conferencing centers use freeze frame video where the picture changes only every six seconds or so instead of full-motion.

On the other hand, supplying a full-motion video signal from a storage device in a computer has its limits as well. The most common computer storage device is the magnetic disk drive (sometimes known as a Winchester drive, hardfile or hard disk) which is an effective method for storing large amounts of data for use by computers and other electronic apparatus. Data are stored on a magnetized disk in clusters, and the data are located on the disk using tables stored on the disk identifying which clusters have the specific data to be read. The performance of magnetic disk drives has increased greatly since they were first invented and numerous physical and software improvements have continued to improve the performance of magnetic disk drives. Magnetic disk drives are now almost universal in devices such as computers and can supply data to the video display at a speed sufficient for full-motion video.

Despite vast improvements in performance, the growth in application software to be stored on magnetic disk drives together with the demands for large amounts of data storage required by such applications as full-motion video have frequently caused users to run up against the storage limits of their magnetic disk drives. By way of example, the large data storage requirements for applications such as full-motion video are often limited to just a few minutes of full-motion video playing time, which is often not sufficient for applications such as education programs.

Solutions to the problem of extending the continuous display time of full-motion video include increasing the size of the data "pipe" to the computer so that data can flow in as fast as they are used, but this can be very expensive, or impractical where existing data pipes are already in place. Another solution to this problem is to vastly increase the absolute size of the magnetic disk drive or the amount of space on the magnetic disk drive reserved for full-motion video data on the user's computer, but this can involve additional expense for a larger magnetic disk drive or can limit the storage space on the magnetic disk drive available for other programs and data.

For the foregoing reasons, there is a need for a means of increasing the amount of full-motion video available on computers without great expense.

SUMMARY OF THE INVENTION

It is therefore an object of the current invention to provide an apparatus for increasing the continuous supply or display time of full-motion video or other data where the quantity of data to be read out in a given amount of time is greater than the quantity of data available to be supplied to a storage device such as a magnetic disk drive in the same given amount of time. The invention makes possible longer continuous full-motion video displays on computers without the expense of upgrading the data pipeline to the computer and without taking excessive amounts of magnetic disk storage capacity for the full-motion video data.

The invention comprises combining a magnetic disk drive with dual rotary actuators, each of which contains one or more heads, with a register and buffer to track data clusters that have been read. In the dual rotary actuator magnetic disk drive both actuators are normally used to either read at the same time or to write at the same time. For normal functions of the computer this arrangement of both actuators writing or both actuators reading continues. When the present invention is in use, however, one actuator and its head or heads is used solely to write to the magnetic disk, while the other actuator and head or heads is used solely to read from the magnetic disk at the same time the other actuator and head or heads is writing to the magnetic disk or disks. The register and buffer keeps track of the data that have been read and only permits the writing head or heads to overwrite data that have already been read.

According to the invention, using multiple heads where one reads while the other writes over the data that have recently been read increases the real-time capacity of the magnetic disk drive for applications such as full motion video. The invention keeps track of the disk address of the data recently read and therefore ensures that only data recently read are overwritten with new data. Using this apparatus the length of continuous viewing time of a full motion video on a computer can be increased many times, depending on the capacity of the data pipeline to the computer.

The best way to understand this invention is by using an analogy to a water tank where the size of the discharge pipe is larger than the size of the pipe used to fill the tank. Assume it takes one hour to fill the tank and 30 minutes to drain the tank. If the tank is first filled and then drained, one gets a thirty minute supply of water. Suppose though that the tank is being filled at the same time as it is being drained. Then, mathematically, one will get one full hour of water supply from the tank. What happens is as the tank is drained in one half hour, the inlet pipe has replenished enough water for an additional fifteen minutes of draining. When that is drained in the next fifteen minutes, the inlet has supplied enough water for an additional seven and one-half minutes of draining, and so on. The total capacity of the system has been doubled. This same thing happens in the present invention (with the added complication of having to track which data have been used before "refilling the tank" at that location on the disk). The data pipeline to the computer is the inlet supply to the tank. The discharge pipe is the full-motion video data transfer rate. The tank is the magnetic disk drive.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This embodiment is applicable to situations where the invention is used to increase the viewing time of full motion video presentations on computers where the capacity of the data pipeline to the computer is less than that required to support full motion video display.

Currently, the communication pipelines (such as twisted pair wires, coaxial cable or modems) used to connect many computers with a data supplier (such as a mainframe computer or on-line service such as the Internet) are often too limited in bandwidth (capacity) to permit real-time full motion video to be displayed on the computer. To provide full motion video, many current systems download the digitized video data from the data provider in its entirety to the computer's magnetic disk drive. The user then plays this data back on the computer after the complete transfer of the data. Because of the large quantity of data required for full motion video, average magnetic disk drives can only store a few minutes of full motion video. The current invention extends the length of the video presentation that can be viewed at the computer without interruption by permitting data to be written to the magnetic disk at the same time that data is being read from the magnetic disk.

Figure 1:
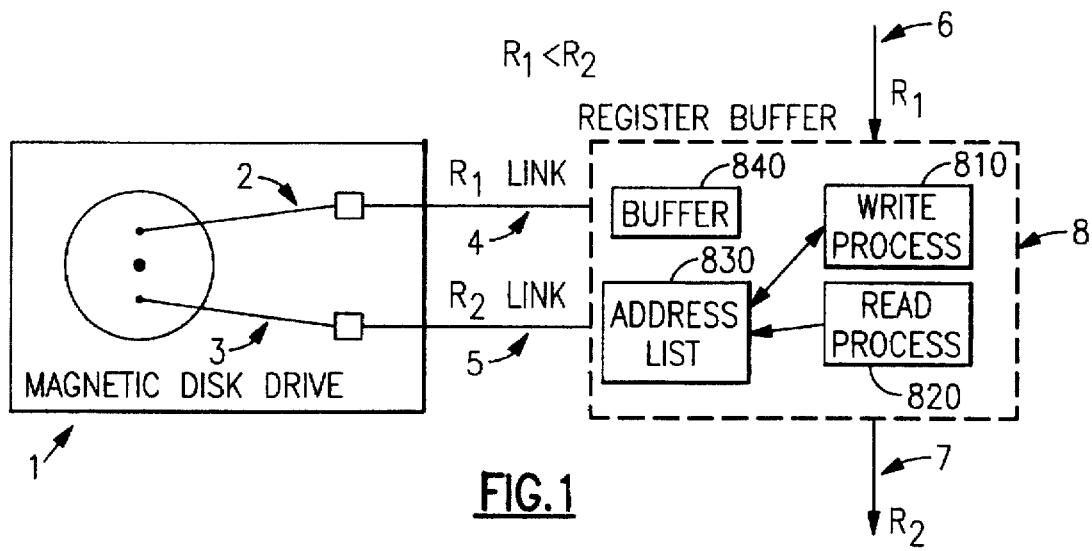
FIG. 1 is a diagram of the invention where the data rate $R_1$ in to the computer is less than the data rate $R_2$ necessary to support full-motion video.
Figure 2:
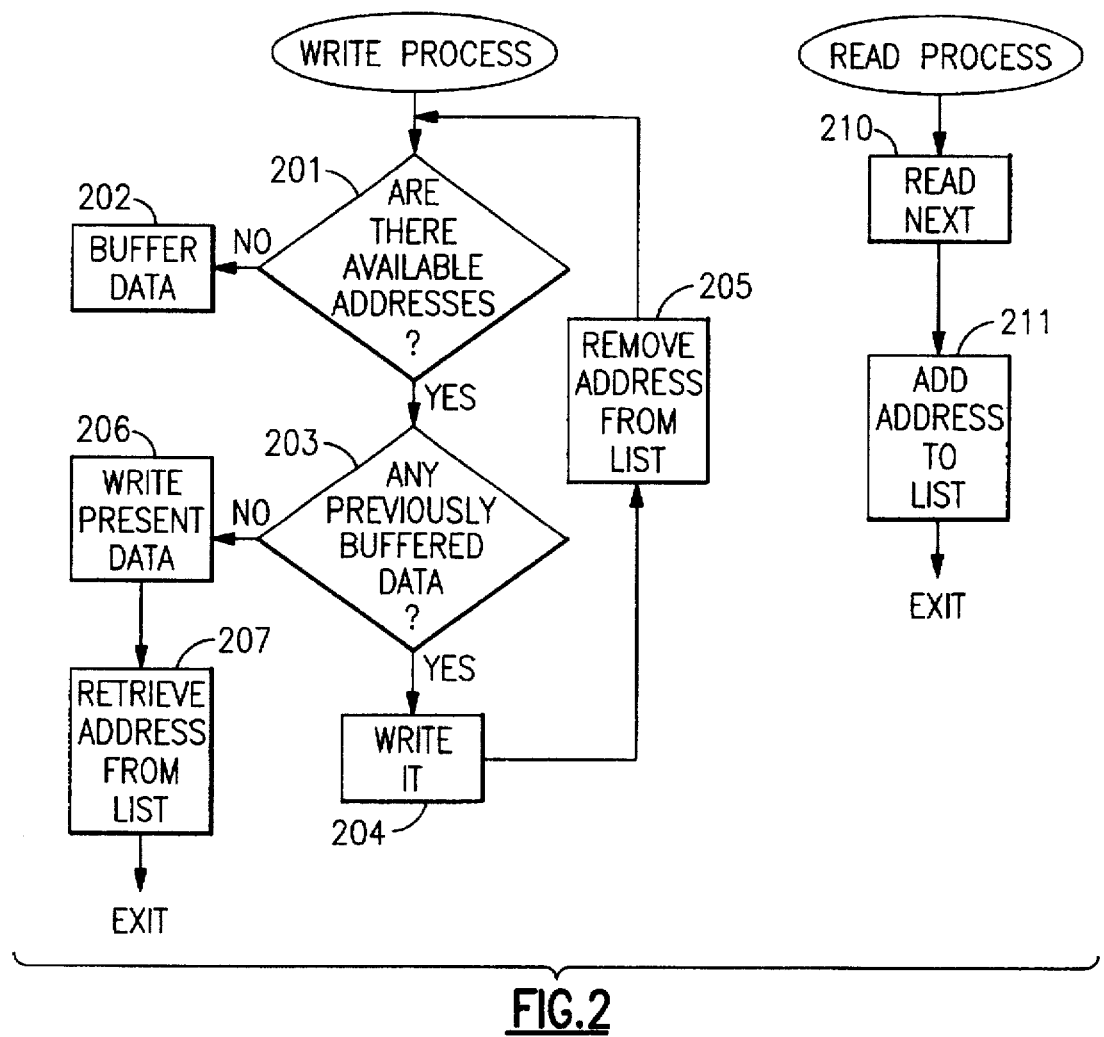
FIG. 2 is a flow chart diagram of the invention which describes the interaction of the register and buffer and the magnetic disk drive.

Referring now to the drawings, in FIG. 1 there is shown a diagram of the invention. In FIG. 2 is shown a flowchart of the invention in operation.

As the figures show, using a standard magnetic disk drive having two actuators where one actuator and head is used to write data and one actuator and head is used to read data permits the video data to be overwritten by the write head or heads as it is read from the disk by the read head or heads. The data cannot be overwritten as fast as it is read because, as referenced in the drawing, the communications link to the computer transmits data at a slower rate (rate $R_1$ in FIG. 1) than the magnetic disk drive reads data for display as full motion video (rate $R_2$ in FIG. 1). (If the communications link provided data at the rate needed for full-motion video there would be no need for this invention). The addition of the write head or heads permits new data to be added at the data transmission rate to the computer ($R_1$ in FIG. 1).

Specifically in FIG. 1, drive 1 is a dual actuator magnetic disk drive having read/write heads on each of the actuators. Actuator and head 2 is used for writing to the disk. Actuator and head 3 is used for reading from the disk. Link 4 connects the register/buffer 8 to the write actuator and head 2. Link 5 connects the register/buffer 8 to the read actuator and head 3. Register/buffer 8 comprises Write Process 810, Read Process 820, Address List 830, and Buffer 840. Input 6 is the connection to register/buffer 8 wherein the "video-in" data are supplied at data rate $R_1$. Output 7 is the connection to register/buffer 8 wherein the "video-out" data are supplied at data rate $R_2$. Data rate $R_2$ is sufficient to support full motion video. Data rate $R_1$ is always less than date rate $R_2$. Register/buffer 8 feeds the "video-in" data to the write head of drive 1 at and average rate of $R_1$. Register/buffer 8 takes the "video-out" data from the read head of drive 1 at an average rate of $R_2$. Register/buffer 8 also complies a list of data cluster addresses which have been read as data are taken from the read head and permits new data to be written to a data cluster only if that data cluster address is on the compiled list to prevent any overwriting of data not already read. Once new data have been written to a data cluster, that data cluster address is deleted from the list of data clusters that have been read so that the process can repeat itself.

FIG. 2 is a flowchart pair showing the operation of the Write Process and Read Process of register/buffer 8 of the invention as described above. Write Process 810 operates in the following manner: at 201, a test is made of Address List 820 to see whether any available addresses are in the list for writing the present data; if not, the present data are placed 202 into Buffer 840. If available addresses exist, a test is made 203 to see whether any previously buffered data exist. If so, the previously buffered data are written 204 and that available address is removed 205 from the list; then test 201 is made again to see whether this writing has eliminated all available addresses; if not (i.e., if available addresses exist), (or if there were no previously buffered data) the present data are written 206 to a location identified by one of the available addresses, and that available address is removed 207 from the available address list.

Read Process 820 operates in the following manner: at 210 the next data cluster is read from the disk. Then the address associated with that data cluster is added 211 to the available address list (so that that data cluster becomes available to the Write Process 810).

The gain in uninterrupted viewing time is expressed by the equation $Y=X/(1-X)$, where X is the data transfer rate of the communications link to the computer divided by the full motion video read rate from the magnetic disk drive (i.e., $R_1$ divided by $R_2$) and Y is the improvement multiplier using this invention. To calculate the percentage improvement, multiply Y by 100%. Thus, for example, if the communication rate between the computer and the data server is 80% of that required to support full motion video, this invention increases the uninterrupted playing time of the magnetic disk drive by 400% (i.e., if $R_1$=0.8 of $R_2$, then X=0.8/1=0.8; and Y=0.8/(1−0.8)=4; in percentage terms, Y=4×100%= 400% improvement).

While the invention has been described in terms of a single preferred embodiment, those skilled in the art will recognize that the invention can be practiced with modification within the spirit and scope of the appended claims.

Upon a reading of the present disclosure, it will be apparent to the skilled artisan that other embodiments of the present invention beyond those embodiments specifically described herein may be made or practiced without departing from the spirit of the invention. It will also be clear to the skilled artisan that numerous equivalent elements may be substituted for elements expressly disclosed herein as a part of a functional limitation described or claimed in means-for terms. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

Having thus described my invention, what I claim as new and desire to secure by Letters patent is as follows:

1. In a data processing system, an apparatus for increasing the length of time for continuous display of full-motion video data, said apparatus comprising:

(a) a disk drive having at least one magnetic disk, wherein the location of data on said at least one disk is tracked by clusters, said disk drive including an independently actuated write head and an independently actuated read head, said write and read heads being capable of accessing data on said at least one magnetic disk by an associated cluster address;

(b) a buffer for temporary storage of said video data which is to be written to said at least one disk;

(c) a cluster address list store;

(d) a write controller for writing said video data, if possible, to a location on said at least one disk which location is indicated in said address list store as having already been read, or, if not possible, to said buffer; and (e) a read controller for updating said address list store to indicate as being available, cluster locations on said at least one disk from which associated video data have already been read.

* * * * *